(12) United States Patent
Li et al.

(10) Patent No.: US 11,436,435 B2
(45) Date of Patent: Sep. 6, 2022

(54) MODEL TRAINING METHOD, STORAGE MEDIUM, AND COMPUTER DEVICE

(71) Applicant: TENCENT TECHNOLOGY (SHENZHEN) COMPANY LIMITED, Shenzhen (CN)

(72) Inventors: Anping Li, Shenzhen (CN); Shaoxin Li, Shenzhen (CN); Chao Chen, Shenzhen (CN); Pengcheng Shen, Shenzhen (CN); Shuang Wu, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 204 days.

(21) Appl. No.: 16/985,170

(22) Filed: Aug. 4, 2020

(65) Prior Publication Data
US 2020/0364502 A1    Nov. 19, 2020

Related U.S. Application Data

(63) Continuation of application No. PCT/CN2019/084946, filed on Apr. 29, 2019.

(30) Foreign Application Priority Data

May 29, 2018  (CN) .......................... 201810530822.9

(51) Int. Cl.
*G06K 9/62*    (2022.01)
*G06N 20/00*   (2019.01)

(52) U.S. Cl.
CPC .......... *G06K 9/6256* (2013.01); *G06K 9/627* (2013.01); *G06K 9/6262* (2013.01); *G06N 20/00* (2019.01)

(58) Field of Classification Search
CPC .. G06K 9/6256; G06K 9/6268; G06K 9/6223; G06K 9/6218; G06K 9/6267; G06N 3/0454
See application file for complete search history.

(56) References Cited

U.S. PATENT DOCUMENTS 8,719,191 B2    5/2014  Baughman
2019/0095705 A1*  3/2019  Yu ......................... G06N 3/0454
(Continued)

FOREIGN PATENT DOCUMENTS

| CN | 105912500 A | 8/2016 |
| CN | 107784312 A | 3/2018 |
| CN | 108805185 A | 11/2018 |

OTHER PUBLICATIONS

The World Intellectual Property Organization (WIPO) International Search Report for PCT/CN2019/084946 dated Aug. 8, 2019 5 Pages (including translation).
(Continued)

*Primary Examiner* — Ross Varndell
(74) *Attorney, Agent, or Firm* — Anova Law Group, PLLC

(57) ABSTRACT

This application relates to a model training method. The method includes retrieving a current group of training samples, the training samples being based on a training set; obtaining first sample features of training samples in the current group of training samples based on a to-be-trained model; and obtaining, center features respectively corresponding to the training samples; obtaining feature distribution parameters corresponding to the training samples, the feature distribution parameter corresponding to each training sample being obtained by collecting statistics on second sample features of training samples in the training set that belong to the same classification category, and the second sample feature of each training sample being generated by a
(Continued)

trained model; obtaining, based on the center features and the feature distribution parameters, a comprehensive loss parameter corresponding to the current group of training samples; and adjusting model parameters of the to-be-trained model based on the comprehensive loss parameter.

20 Claims, 9 Drawing Sheets

(56) References Cited

U.S. PATENT DOCUMENTS

2020/0090073 A1    3/2020  Zhan et al.
2021/0295099 A1*  9/2021  Huang ................ G06K 9/6201

OTHER PUBLICATIONS

The European Patent Office (EPO) The Extended European Search Report for 19810192.5 dated Jun. 16, 2021 10 Pages.
Chenglin Yang et al., "Knowledge Distillation in Generations: More Tolerant Teachers Educate Better Students," arXiv preprint arXiv:1805.05551, May 15, 2018. 12 pages.
Shan You et al., "Learning from Multiple Teacher Networks," Knowledge Discovery and Data Mining, Aug. 4, 2017, pp. 1285-1294. 10 pages.

* cited by examiner

MODEL TRAINING METHOD, STORAGE MEDIUM, AND COMPUTER DEVICE

RELATED APPLICATIONS

This application claims priority to PCT Application No. PCT/CN2019/084946, which claims priority to Chinese Patent Application No. 2018105308229, entitled "MODEL TRAINING METHOD AND APPARATUS, STORAGE MEDIUM, AND COMPUTER DEVICE" filed on May 29, 2018. Both applications are incorporated by reference in their entirety.

FIELD OF THE TECHNOLOGY

This application relates to the field of computer technologies, and in particular, to a model training method, a computer-readable storage medium, and a computer device.

BACKGROUND OF THE DISCLOSURE

With the development of artificial intelligence (AI) technologies, various classification tasks, such as image classification tasks, speech classification tasks, and text classification tasks, can be implemented by machine learning models. Before an actual classification task is executed, model training is required to obtain a machine learning model with a corresponding classification capability.

In an alternative model training method, a training set is obtained first. The training set includes training samples with category labels, which are used for representing real classification results of the training samples. Then, the training samples are inputted into a to-be-trained model. The to-be-trained model by itself obtains model prediction results of the training samples, adjusts, according to differences between the model prediction results of the training samples and the category labels of the training samples, model parameters of the to-be-trained model through a plurality of iterations, and stops training when a training stop condition is met. However, this alternative training method is time-consuming and inefficient.

SUMMARY

In view of this, a model training method, a computer-readable storage medium, and a computer device are provided without the problem of inefficient training in the alternative training method.

One aspect of the present disclosure provides a model training method. The method includes retrieving, by a computer device, a current group of training samples, the current group of training samples being determined based on a training set; obtaining, by the computer device, first sample features of training samples in the current group of training samples based on a to-be-trained model, and obtaining, based on classification categories to which the training samples belong and the first sample features, center features corresponding to the training samples; obtaining, by the computer device, feature distribution parameters corresponding to the training samples, the feature distribution parameter corresponding to each training sample being obtained based on second sample features of training samples in the training set that belong to the same classification category as each of the training sample, and the second sample feature of each training sample being generated by a trained model based on each of the training sample; obtaining, by the computer device based on the center features and the feature distribution parameters, a comprehensive loss parameter corresponding to the current group of training samples; and adjusting model parameters of the to-be-trained model based on the comprehensive loss parameter.

Another aspect of the present disclosure provides a computer device. The computer device includes a memory and a processor, the memory storing a computer program, and the processor, when executing the computer program, performing a model training method. The method includes receiving a current group of training samples, the current group of training samples being determined based on a training set; obtaining first sample features of training samples in the current group of training samples based on a to-be-trained model, and obtaining, based on classification categories to which the training samples belong and the first sample features, center features corresponding to the training samples; obtaining feature distribution parameters corresponding to the training samples, the feature distribution parameter corresponding to each training sample being obtained based on second sample features of training samples in the training set that belong to the same classification category as each of the training sample, and the second sample feature of each training sample being generated by a trained model based on each of the training sample; obtaining, based on the center features and the feature distribution parameters, a comprehensive loss parameter corresponding to the current group of training samples; and adjusting model parameters of the to-be-trained model based on the comprehensive loss parameter.

Another aspect of the present disclosure provides a non-transitory computer-readable storage medium. The computer-readable storage medium stores a computer program, the computer program, when being executed by a processor, causing the processor to perform the steps of the foregoing model training method. The method includes receiving a current group of training samples, the current group of training samples being determined based on a training set; obtaining first sample features of training samples in the current group of training samples based on a to-be-trained model, and obtaining, based on classification categories to which the training samples belong and the first sample features, center features corresponding to the training samples; obtaining feature distribution parameters corresponding to the training samples, the feature distribution parameter corresponding to each training sample being obtained based on second sample features of training samples in the training set that belong to the same classification category as each of the training sample, and the second sample feature of each training sample being generated by a trained model based on each of the training sample; obtaining, based on the center features and the feature distribution parameters, a comprehensive loss parameter corresponding to the current group of training samples; and adjusting model parameters of the to-be-trained model based on the comprehensive loss parameter.

DESCRIPTION OF EMBODIMENTS

To make the objectives, the technical solutions, and the advantages of this application clearer, the following further describes some embodiments of this application in detail with reference to the accompanying drawings and the embodiments. It is to be understood that the specific embodiments described herein are merely used for explaining this application, and are not intended to limit this application.

Terms "first", "second", and the like used in this application are used for distinguishing similar objects in name, but the objects are not limited by the terms. It is to be understood that the terms are interchangeable in a suitable case without departing from the scope of this application. For example, "first loss parameter" may be described as "second loss parameter", and similarly, "second loss parameter" may be described as "first loss parameter".

Moreover, the terms "include", "comprise", "have", and any variants thereof are intended to cover a non-exclusive inclusion. For example, a process, method, system, product, or device that includes a series of steps or elements not only includes such steps or elements that are clearly listed, but also includes other steps or elements that are not expressly listed or that are inherent to the process, method, product, or device.

Figure 1:
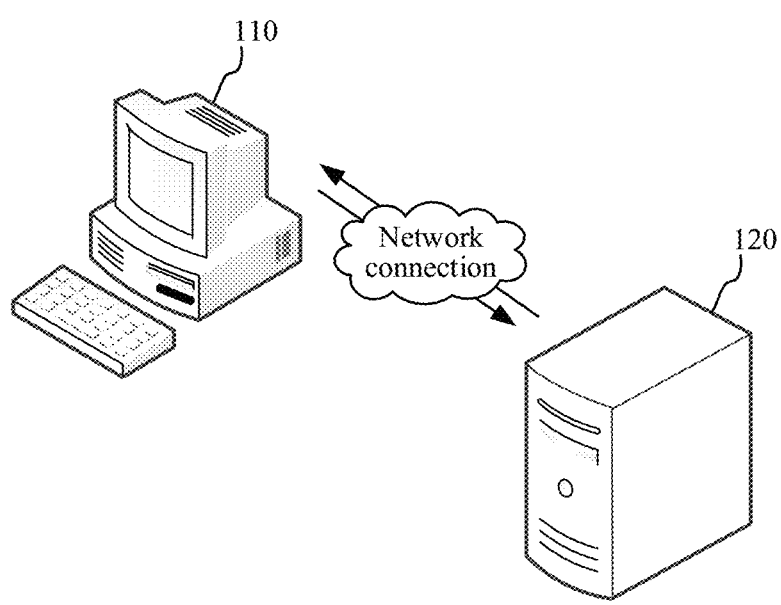
FIG. 1 is a diagram showing an application environment of a model training method according to one embodiment.

Model training methods provided in the embodiments of this application may be applied in an application environment shown in FIG. 1. The application environment may include a terminal 110 and a server 120. The terminal 110 and the server 120 may be connected through a network. Specifically, a training set on the terminal 110 may be uploaded to the server 120, and then the server 120 may train a to-be-trained model based on training samples in the training set. Alternatively, a training set on the server 120 may be delivered to the terminal 110, and then the terminal 110 may train a to-be-trained model based on training samples in the training set. Terminals may upload training samples to the server 120, and the server 120 may form a training set based on training samples uploaded by a plurality of terminals.

It is to be understood that this application is not limited to the application environment shown in FIG. 1, but may be applied to any suitable application environment. For example, in other application environments may not include the server 120 shown in FIG. 1, and the terminal 110 directly trains the to-be-trained model based on training samples in a local training set.

In addition, the terminal 110 may be a desktop terminal or a mobile terminal. The desktop terminal may include a desktop computer or the like. The mobile terminal may include at least one of a mobile phone, a tablet computer, a notebook computer, a personal digital assistant, or a wearable device. The server 120 may be implemented by an independent physical server or a server cluster that includes a plurality of physical servers.

Figure 2:
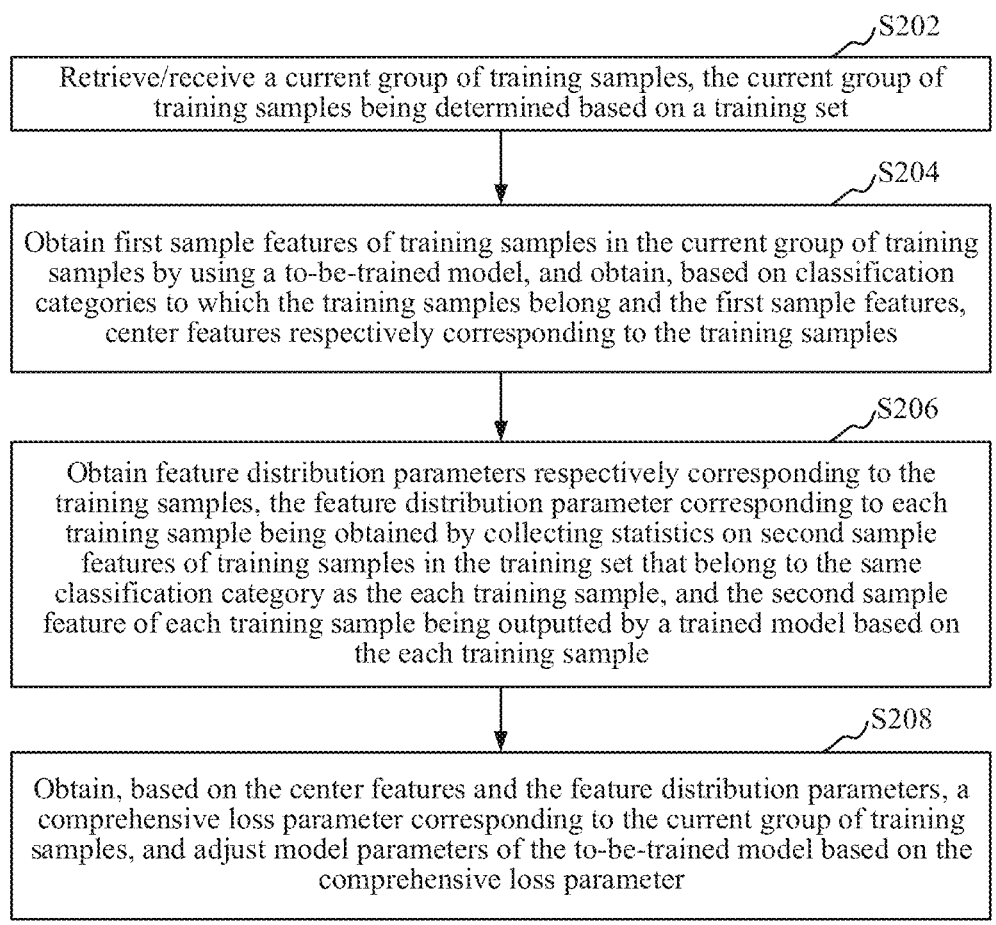
FIG. 2 is a schematic flowchart of a model training method according to one embodiment.

As shown in FIG. 2, one embodiment of the present disclosure provides a model training method. One implementation of the method to a computer device (for example, the terminal 110 or the server 120 in FIG. 1) is described as an example. The method may include step S202 to step S208.

S202: The computer device retrieves a current group of training samples, the current group of training samples being determined based on a training set.

The training set, or referred to as a training dataset, includes training samples that need to be used for training a to-be-trained model. The training samples are samples that have been marked with classification categories to which the samples belong. Specifically, the training samples have category labels, which are used for representing the classification categories to which the corresponding training samples belong. The category labels may be determined through manual analysis, for example, by an expert in the art.

Different training samples may be used for different classification tasks. For example, for image classification tasks, training samples may be image samples. More specifically, for face recognition tasks, training samples may be face image samples. For audio classification tasks, training samples may be audio samples. For text classification tasks, training samples may be text samples.

The current group of training samples includes training samples that need to be used for the current model parameter adjustment. It is to be understood that to complete training of the to-be-trained model, usually multiple model parameter adjustments need to be performed. During the training of the to-be-trained model, model parameters of the to-be-trained model may be adjusted once each time the current group of training samples is retrieved.

In one embodiment, the current group of training samples is determined based on the training set, and the current group of training samples may include some of training samples in the training set. In this case, the training set is divided into several groups of training samples (or referred to as several sample data blocks), each group of training samples including more than one training sample. Then, each time when the model parameters of the to-be-trained model need to be adjusted, first, a group of training samples is selected from the groups of training samples as the current group of training samples, and then the model parameters of the to-be-trained model are adjusted once based on the current group of training samples. It may be understood that a quantity of training samples included in each group of training samples may be determined based on actual requirements and experience. For example, a training set Sett1 including 5000 image samples may be divided into 100 groups of image samples, each group of image samples including 50 image samples.

In another embodiment, the current group of training samples may include all the training samples in the training set, that is, the current group of training samples is the complete training set.

Generally, when the training set includes a relatively large quantity of training samples, the training set is divided into several groups of training samples. Each time a group of training samples is retrieved, the model parameters of the to-be-trained model are adjusted once based on the group of training samples. When the training set includes a relatively small quantity of training samples, the training set may not be divided. Each time the complete training set is retrieved, the model parameters of the to-be-trained model are adjusted once based on the training set.

Retrieving the current group of training samples may be inputting training samples in the current group of training samples into the to-be-trained model. Specifically, the retrieving may be sequentially inputting the training samples into the to-be-trained model.

In the case that the training set is divided, one or more groups of training samples obtained through the division may be used as test sets to test a model obtained after the model training to determine the classification accuracy of the model.

S204: The computer device obtains first sample features of training samples in the current group of training samples by using a to-be-trained model, and obtains, based on classification categories to which the training samples belong and the first sample features, center features respectively corresponding to the training samples.

The to-be-trained model may be a machine learning model for which model training is to be performed. The purpose of model training is to enable the to-be-trained model to learn inherent laws contained in the training samples, thereby making the model capable of completing corresponding classification tasks. Specifically, the model training may include adjusting the model parameters of the to-be-trained model based on training samples.

Specifically, the to-be-trained model may be a deep learning model which is a type of machine learning model, such as a convolution neural network (CNN) model. For the deep learning model, there is no need to manually design input features of the model based on training samples; instead, training samples are directly input into the model, and then the deep learning model learns by itself the training samples and predicts classification categories to which the training samples belong.

A sample feature may be used for representing a characteristic of a training sample, and the characteristic may be used as a basis for the model to predict a classification category to which the training sample belongs. The first sample feature is a sample feature obtained by the to-be-trained model based on the training sample. In addition, each training sample corresponds to one first sample feature.

In an example where the training samples are image samples, a first sample feature of any image sample that is inputted into the to-be-trained model may be an image feature abstracted by the to-be-trained model by performing processing such as convolution, pooling, and relu on the image sample. In addition, the image feature may be specifically a very compact feature with a small quantity of dimensions, for example, a feature vector $f=(f_1, \ldots, f_{n_d})$ of $1 \times n_d$, where $n_d$ representing a quantity of feature dimensions.

A center feature may be used for representing the location of a center point of first sample features of training samples under the classification category to which a training sample corresponding to the center feature belongs. In one embodiment, the center feature may be a mean.

In some embodiments, each training sample in the current group of training samples corresponds to one center feature. In addition, for any training sample, the corresponding center feature may be determined based on the first sample feature of the training sample and the classification category to which the training sample belongs.

In one embodiment, for any training sample, the corresponding center feature may be determined in the following manner. First, a current center feature corresponding to the classification category to which the training sample belongs is determined. The current center feature corresponding to the classification category is determined by first sample features of training samples that belong to the classification category and are inputted into the to-be-trained model before the training sample. Then, the current center feature is updated based on the first sample feature of the training sample to obtain an updated center feature corresponding to the classification category to which the training sample belongs, and the updated center feature is used as the center feature corresponding to the training sample.

When a training sample is the first one to have its corresponding center feature determined among training samples under the classification category to which the training sample belongs, that is, no center feature has been determined for any training sample under the classification category before the training sample, the obtained current center feature corresponding to the classification category is an initial center feature value, the initial center feature value being a random value determined during initialization of the center feature. For any classification category, the value of the corresponding center feature is initially the initial center feature value, and is continuously updated based on first sample features of training samples to gradually approach a real mean of the training samples that belong to the classification category.

For example, a classification task of a to-be-trained model M1 is to recognize whether a face image is that of "Jack", that is, classification categories include "Jack" and "Not Jack". A training set Sett2 includes training samples TS1 to TS6, i.e., a total of six face image samples. The training samples TS1 to TS3 form one group of training samples, and the training samples TS4 to TS6 form another group of training samples. In addition, a classification category represented by a category label for the training samples TS1, TS3, TS4, and TS6 is "Jack", and a classification category represented by a category label for the training samples TS2 and TS5 is "Not Jack" (hereinafter briefly referred to as an example E-1).

When the model parameters of the to-be-trained model are adjusted for the first time, the group of training samples that includes the training samples TS1 to TS3 is used as the current group of training samples. First, the to-be-trained model obtains a first sample feature F11 of the training sample TS1. The training sample TS1 is the first one to have its corresponding center feature determined among training samples under the classification category "Jack". Therefore, the initial center feature value is updated based on the first sample feature F11, to obtain a center feature CF1 corresponding to the training sample TS1. Then, the to-be-trained model obtains a first sample feature F12 of the training sample TS2. The training sample TS2 is the first one to have its corresponding center feature determined among training samples under the classification category "Not Jack". Therefore, the initial center feature value is updated based on the first sample feature F12, to obtain a center feature CF2 corresponding to the training sample TS2. Afterward, the to-be-trained model obtains a first sample feature F13 of the training sample TS3. The training sample TS1 that also belongs to the classification category "Jack" has had its corresponding center feature determined before the training sample TS3. Therefore, the center feature CF1 is updated based on the first sample feature F13, to obtain a center feature CF3 corresponding to the training sample TS3.

When the model parameters of the to-be-trained model are adjusted for the second time, the group of training samples that includes the training samples TS4 to TS6 is used as the current group of training samples. First, the to-be-trained model obtains a first sample feature F14 of the training sample TS4. The center feature CF3 is updated based on the first sample feature F14, to obtain a center feature CF4 corresponding to the training sample TS4. Then, the to-be-trained model obtains a first sample feature F15 of the training sample TS5. The center feature CF2 is updated based on the first sample feature F15, to obtain a center feature CF5 corresponding to the training sample TS5. Afterward, the to-be-trained model obtains a first sample feature F16 of the training sample TS6. The center feature CF4 is updated based on the first sample feature F16, to obtain a center feature CF6 corresponding to the training sample TS6. The subsequent adjustments of the model parameters of the to-be-trained model are similar to the foregoing process, and details will not be provided herein again.

In one embodiment, a current center feature corresponding to a classification category may be specifically updated according to the following formula:

$$C_{y(i)}(t)=(1-\alpha)C_{y(i)}(t-1)+\alpha f_i(t),$$

where y(i) represents a classification category to which an $i^{th}$ training sample really belongs (that is, a classification category represented by a category label of the $i^{th}$ training sample), $C_{y(i)}(t-1)$ represents a center feature corresponding to the classification category y(i) at a moment t−1 (that is, a current center feature corresponding to the classification category y(i)), $C_{y(i)}(t)$ represents a center feature corresponding to the classification category y(i) at a moment t (that is, an updated center feature corresponding to the classification category y(i), namely, a center feature corresponding to the $i^{th}$ training sample), $f_i(t)$ represents a first sample feature of the $i^{th}$ training sample at the moment t (that is, a current first sample feature of the $i^{th}$ training sample), and α represents an update speed control coefficient. A larger value of α indicates a higher update speed, and a smaller value of α indicates a lower update speed. For example, a value of α may be 0.95.

S206: The computer device obtains feature distribution parameters respectively corresponding to the training samples, the feature distribution parameter corresponding to each training sample being obtained by collecting statistics on second sample features of training samples in the training set that belong to the same classification category as each of the training sample, and the second sample feature of each training sample being outputted by a trained model based on each of the training sample.

The trained model is a machine learning model that has been trained before the training of the to-be-trained model starts, and may be used to help train the to-be-trained model. Similar to the to-be-trained model, the trained model may be a deep learning model.

Specifically, the framework of the trained model may be different from that of the to-be-trained model. In one embodiment, a scale parameter of the trained model exceeds that of the to-be-trained model. The scale parameter includes a depth of a model (that is, a quantity of network layers included in the model). In other words, the trained model has a higher scale, higher complexity, and higher working performance (for example, classification accuracy) than those of the to-be-trained model.

In one example, the frameworks of the to-be-trained model and the trained model may both be obtained based on Google's Inception-Resnet framework. The quantity of network layers included in the trained model is 180 and the quantity of network layers included in the to-be-trained model is 80.

The frameworks of the to-be-trained model and the trained model may be obtained based on other model frameworks, such as a Visual Geometry Group (VGG) framework, an InceptionV3 framework, and a DenseNet framework. In addition, an existing model framework may be directly used as the framework of the trained model based on actual requirements, or the framework of the trained model may be obtained by improving an existing model framework based on actual requirements, or the framework of the trained model may be a new one designed independently based on actual requirements. This is not specifically limited in this application.

A second sample feature is a sample feature that is outputted by the trained model based on the training sample corresponding to the trained model. In addition, each training sample corresponds to one second sample feature. Similar to the foregoing description of the first sample feature, in an example where the training samples are image samples, a second sample feature of any image sample that is inputted into the trained model may be an image feature abstracted by the trained model by performing processing such as convolution, pooling, and relu on the image sample. The image feature may be a very compact feature with a small quantity of dimensions, for example, a feature vector $f=(f_1, \ldots, f_{n_d})$ of $1 \times n_d$, $n_d$ representing a quantity of feature dimensions.

A feature distribution parameter may be used for representing a data distribution characteristic of second sample features of training samples under the classification category to which a training sample corresponding to the feature distribution parameter belongs (that is, belonging to the classification category to which the corresponding training sample belongs), and may be used as a supervision signal for training the to-be-trained model. In this embodiment, each classification category corresponds to one feature distribution parameter, and a feature distribution parameter corresponding to a training sample is a feature distribution parameter corresponding to the classification category to which the training sample belongs. Therefore, it can be learned that training samples that belong to the same classification category correspond to the same feature distribution parameter. In addition, for any training sample, the corresponding feature distribution parameter is obtained by collecting statistics on second sample features of training samples in the training set that belong to the same classification category as the training sample.

For example, in the foregoing example E-1, each of the two classification categories "Jack" and "Not Jack" corresponds to one feature distribution parameter. It is assumed that the classification category "Jack" corresponds to a feature distribution parameter FD1 and the classification category "Not Jack" corresponds to a feature distribution parameter FD2. Based on this, feature distribution parameters corresponding to the training samples TS1, TS3, TS4, and TS6 are the feature distribution parameter FD1 corresponding to the classification category "Jack", and feature distribution parameters corresponding to the training samples TS2 and TS5 are the feature distribution parameter FD2 corresponding to the classification category "Not Jack".

In one embodiment, the feature distribution parameter may essentially be a Gaussian distribution parameter, which specifically include a mean and a covariance. That is, $D_i \sim N(\mu_i, \Sigma_i)$, where $D_i$ represents a feature distribution corresponding to the classification category to which the $i^{th}$ training sample belongs, $\mu_i$ represents a mean obtained by collecting statistics on second sample features of training samples under the classification category to which the $i^{th}$ training sample belongs, $\Sigma_i$ represents a covariance obtained by collecting statistics on the second sample features of the training samples under the classification category to which the $i^{th}$ training sample belongs, and $N(\mu_i, \Sigma_i)$ represents a Gaussian distribution function with a mean $\mu_i$ and a covariance $\Sigma_i$. In addition, the covariance may be in a data form of a matrix.

In this embodiment, for each training sample in the current group of training samples, the corresponding feature distribution parameter may be obtained based on the category label of the training sample by using the to-be-trained model.

Still using the foregoing example E-1 as an example for description, first, the trained model obtains second sample features F21 to F26 that respectively correspond to the training samples TS1 to TS6. Then, statistics are collected on the second sample features F21, F23, F24, and F26 to obtain the feature distribution parameter FD1 corresponding to the classification category "Jack", and statistics are collected on the second sample features F22 and F25 to obtain the feature distribution parameter FD2 corresponding to the classification category "Not Jack". Afterward, when the model parameters of the to-be-trained model are adjusted for the first time, the group of training samples that includes the training samples TS1 to TS3 is used as the current group of training samples. The to-be-trained model first obtains the feature distribution parameter FD1 corresponding to the training sample TS1 based on the category label of the training sample TS1, obtains the feature distribution parameter FD2 corresponding to the training sample TS2 based on the category label of the training sample TS2, and then obtains the feature distribution parameter FD1 corresponding to the training sample TS3 based on the category label of the training sample TS3. The subsequent adjustments of the model parameters of the to-be-trained model are similar to the foregoing process, and details will not be provided herein again.

S208: The computer device obtains, based on the center features and the feature distribution parameters, a comprehensive loss parameter corresponding to the current group of training samples, and adjusts model parameters of the to-be-trained model based on the comprehensive loss parameter.

The comprehensive loss parameter may be used as a direct basis for the current model parameter adjustment. Specifically, back-propagation may be performed based on the comprehensive loss parameter to adjust the model parameters of the to-be-trained model. Specifically, the back-propagation may be implemented based on any suitable back-propagation manner, for example, batch gradient descent.

The model parameters are parameter that are used for model prediction. The model prediction is a process in which the model predicts a classification task based on an input of the model and obtains a corresponding prediction result. The model parameters may include a weight parameter of each network layer in the model.

Specifically, each time the model parameters of the to-be-trained model are adjusted, the model parameters obtained after a previous adjustment are adjusted based on a corresponding comprehensive loss parameter. Before the to-be-trained model is trained, the model parameter needs to be initialized to obtain initial model parameters. Then, when the model parameters of the to-be-trained model are adjusted for the first time, a comprehensive loss parameter corresponding to a current group of training samples is obtained, and then the initial model parameters are adjusted based on the comprehensive loss parameter to obtain first adjusted model parameters after the first adjustment. Then, when the model parameters of the to-be-trained model are adjusted for the second time, a comprehensive loss parameter corresponding to another current group of training samples is obtained, and then the first adjusted model parameters obtained after the first adjustment are adjusted based on the comprehensive loss parameter to obtain second adjusted model parameters after the second adjustment. The subsequent adjustments of the model parameters of the to-be-trained model are similar to the relevant descriptions in the foregoing process, and details will not be repeated herein again.

The model training method provided in this embodiment may be a model distillation method. Model distillation refers to the idea of model compression by teaching a smaller network, step by step, exactly what to do using a larger already trained network. In other words, model distillation is a method of using a teacher model to teach a student model to transfer "knowledge" from the teacher model to the student model, so that the student model can achieve a learning effect close to that of the teacher model. The teacher model is usually a high-precision large model that has been trained, and the student model may be a small model that needs to be trained. In this application, the trained model functions as the teacher model and the to-be-trained model functions as the student model.

Due to its large scale, high complexity, and large computation amount, the teacher model is not suited to be implemented in an embedded device with limited computing capability. The student model has a simple structure and low computational complexity, and provides working performance which is close to that of the teacher model after being taught by the teacher model. Therefore, the student model can be widely deployed on various embedded devices. Using the application to face recognition as an example, the student model taught by the teacher model can be applied to various embedded device scenarios such as face recognition in a mobile phone, an access control system based on face recognition, and an attendance system based on face recognition.

In addition, during the model distillation, the teacher model may output a teacher model prediction result for a single training sample, and the teacher model prediction result is inputted into the student model as a supervision signal. The student model also obtains a student model prediction result for the single training sample. Then, model parameters of the student model are adjusted based on the student model prediction result and the teacher model prediction result. However, in this case, an incorrect teacher model prediction result that is outputted by the teacher model directly results in an incorrect parameter adjustment of the student model. In other words, the student model has weak resistance against incorrect outputs from the teacher model.

According to the model training method provided in this embodiment, a center feature corresponding to a training sample is obtained based on a first sample feature of the training sample and a classification category to which the training sample belongs, and a feature distribution parameter corresponding to the training sample is obtained. The feature distribution parameter is obtained by collecting statistics on second sample features of training samples in a training set that belongs to the classification category to which the training sample belongs. Then, model parameters of a to-be-trained model are adjusted based on the center features and the feature distribution parameters. In this way, compared with the conventional method in which supervision is performed based only on category labels, training of a to-be-trained model is supervised based on an output of a trained model, and useful information of the trained model can be migrated to the to-be-trained model, thereby improving the training efficiency. In addition, the feature distribution parameter obtained through statistics collection, not a single sample feature outputted by the trained model, is used as a supervision signal, thereby diluting impact of an incorrect output from the trained model and improving the resistance of the to-be-trained model against an incorrect output of the trained model.

In one embodiment, the foregoing step of obtaining feature distribution parameters respectively corresponding to the training samples, that is, step S206, may include the following step: querying a distribution parameter set based on a category label of each training sample to obtain the feature distribution parameter corresponding to each of the training sample, the category label being used for representing the classification category to which the corresponding training sample belongs, and the distribution parameter set including the feature distribution parameter corresponding to each classification category.

The distribution parameter set is used for recording a feature distribution parameter corresponding to each classification category, and may be used for querying a feature distribution parameter corresponding to a classification category. Specifically, the distribution parameter set records feature distribution parameters and a correspondence between classification categories and the feature distribution parameters. For example, in the foregoing example E-1, a distribution parameter set Sets1 records the feature distribution parameter FD1 corresponding to the classification category "Jack" and the feature distribution parameter FD2 corresponding to the classification category "Not Jack". In addition, the distribution parameter set may essentially be a database file.

In this embodiment, the distribution parameter set may be obtained before the to-be-trained model is trained. When a feature distribution parameter corresponding to a training sample needs to be determined, the distribution parameter set is queried, that is, the distribution parameter set is searched for a feature distribution parameter corresponding to a classification category to which the training sample belongs. Specifically, the to-be-trained model may initiate a query request to trigger a query operation.

In addition, as described above, a category label may be used for representing a classification category to which a training sample corresponding to the category label belongs. Therefore, the distribution parameter set may be queried based on the category label of the training sample, that is, the distribution parameter set may be searched for a feature distribution parameter corresponding to a classification category represented by the category label. For example, the category label of the foregoing training sample TS1 represents the classification category "Jack", and based on the category label, the distribution parameter set Sets1 is searched for the feature distribution parameter corresponding to the classification category "Jack". The found feature distribution parameter FD1 is the feature distribution parameter corresponding to the training sample TS1.

If both the trained model and the to-be-trained model are run simultaneously during the training of the to-be-trained model, a relatively large quantity of hardware resources, especially graphic processing unit (GPU) video memory, need to be occupied and a long training time is required when the trained model is at a large scale. However, in this embodiment, during the training of the to-be-trained model, the trained model does not need to be run in the process of determining a feature distribution parameter corresponding to a training sample, and simply by querying the distribution parameter set, the trained model can be caused to perform forward propagation to output a second sample feature in real time, thereby greatly reducing the quantity of hardware resources required and reducing the training time.

In one embodiment, a manner of obtaining the distribution parameter set may include the following steps: inputting each training sample in the training set into the trained model; outputting a second sample feature of each training sample in the training set by using the trained model; collecting statistics on second sample features of training samples in the training set that belong to each classification category to determine the feature distribution parameter corresponding to each of the classification category; and storing each determined feature distribution parameter corresponding to each classification category, to obtain the distribution parameter set.

In this embodiment, before the training of the to-be-trained model is started, training samples that need to be used during the training of the to-be-trained model (that is, training samples in the training set) may be inputted into the trained model. Then, the trained model performs feature obtaining processing on the training samples to obtain second sample features respectively corresponding to the training samples, and outputs the second sample features. Afterward, a corresponding function module running on the computer device may be used to collect statistics on second sample features of training samples in the training set that belong to each classification category to determine the feature distribution parameter corresponding to each of the classification category. Then, the determined feature distribution parameters are stored, thus obtaining the distribution parameter set.

In one embodiment, the foregoing step of collecting statistics on second sample features of training samples in the training set that belong to each classification category to determine the feature distribution parameter corresponding to each of the classification category may include the following steps: determining a sample feature mean corresponding to each classification category, the sample feature mean corresponding to each classification category being a mean of second sample features of the training samples in the training set that belong to each of the classification category; determining a sample feature covariance corresponding to each classification category, the sample feature covariance corresponding to each classification category being a covariance of the second sample features of the training samples in the training set that belong to each of the classification category; and determining, based on the sample feature mean and the sample feature covariance corresponding to each classification category, the feature distribution parameter corresponding to each of the classification category.

The sample feature mean is a mean of second sample features of the training samples in the training set that belong to the classification category corresponding to the sample feature mean. It may be understood that, a mean may be used for representing the location of a center point of a set of data. Correspondingly, the sample feature mean may be used for representing the location of a center point of the second sample features of the training samples in the training set that belong to the classification category corresponding to the sample feature mean.

The sample feature covariance is a covariance of the second sample features of the training samples in the training set that belong to the classification category corresponding to the sample feature mean. It may be understood that a covariance may be used for representing a degree to which a set of data is discrete. Correspondingly, the sample feature covariance may be used for representing a degree to which the second sample features of the training samples that belong to the classification category corresponding to the sample feature mean are discrete.

In this embodiment, the feature distribution parameter corresponding to each classification category is determined based on the sample feature mean and the sample feature covariance corresponding to each of the classification category. It can be learned that for any classification category, the corresponding feature distribution parameter essentially includes two parameters: mean and covariance. That is, a Gaussian distribution is used to describe a data distribution characteristic of the second sample features of the training samples that belong to the classification category.

In one embodiment, before the foregoing step of obtaining, based on the center features and the feature distribution parameters, a comprehensive loss parameter corresponding to the current group of training samples, that is, before step S208, the method may further include the following steps: obtaining, based on the first sample features, a model prediction result of each training sample by using the to-be-trained model; and determining, based on the model prediction result and a category label of each training sample, a first loss component corresponding to each of the training sample, the category label being used for representing the classification category to which the corresponding training sample belongs.

In this case, the foregoing step of obtaining, based on the center features and the feature distribution parameters, a comprehensive loss parameter corresponding to the current group of training samples may include the following steps: determining, based on the center features and the feature distribution parameters, a second loss component corresponding to each training sample; and obtaining, based on the first loss component and the second loss component, the comprehensive loss parameter corresponding to the current group of training samples.

The model prediction result is a classification category of a training sample that is predicted by the to-be-trained model, and is obtained by the to-be-trained model based on the training sample. It may be understood that if the model prediction result is consistent with the category label of the training sample, it indicates that the prediction of the to-be-trained model is correct, and if they are inconsistent, it indicates that the prediction of the to-be-trained model is incorrect.

The first loss component may be used for representing a degree of inconsistency between the model prediction result and the category label of the training sample corresponding to the first loss component. In addition, each training sample corresponds to one first loss component. Specifically, for any training sample, the corresponding first loss component may be determined based on the model prediction result and the category label of the training sample and a first loss function. The first loss function may be any suitable loss function. For example, the first loss function may be a SoftMax loss function.

In a specific example, the first loss function may be as shown by the following formula. First, a weight matrix of a fully connected layer of the to-be-trained model includes columns corresponding to classification categories. For example, in the foregoing example E-1, the weight matrix of the fully connected layer of the to-be-trained model includes a column corresponding to the classification category "Jack" and a column corresponding to the classification category "Not Jack".

$$L_{s-i} = -\log \frac{e^{f_i W_{y(i)}^T}}{\sum_{j=1}^{n_c} e^{f_i W_j^T}}$$

where $L_{s-i}$ represents a first loss component corresponding to an $i^{th}$ training sample, $f_i$ represents a first sample feature of the $i^{th}$ training sample, $y(i)$ represents a classification category represented by a category label of the $i^{th}$ training sample, $W_{y(i)}^T$ represents an inversed matrix of a column corresponding to the classification category $y(i)$ in the weight matrix of the fully connected layer of the to-be-trained model, $W_j^T$ represents an inversed matrix of a $j^{th}$ column in the weight matrix of the fully connected layer, and $n_c$ represents a total quantity of classification categories.

The second loss component may be used for representing a degree of inconsistency between a center feature of a training sample corresponding to the second loss component and a feature distribution parameter corresponding to the training sample. In addition, each training sample corresponds to one second loss component. Specifically, for any training sample, the corresponding second loss component may be determined based on a center feature and a feature distribution parameter corresponding to the training sample and a second loss function. The second loss function may be any suitable loss function.

In a specific example, the second loss function may be as shown by the following formula:

$$L_{f-i} = 1.0 - (2\pi)^{-\frac{n_d}{2}} |\sum_{y(i)}|^{-\frac{1}{2}} e^{-\frac{1}{2}[C_{y(i)} - \mu_{y(i)}] \sum_{y(i)}^{-1} [C_{y(i)} - \mu_{y(i)}]^T}$$

where $L_{f-i}$ represents a second loss component corresponding to an $i^{th}$ training sample, $n_d$ represents a quantity of feature dimensions in a first sample feature of the $i^{th}$ training sample, $\Sigma_{y(i)}$ represents a covariance of feature distribution parameters corresponding to the classification category $y(i)$, $C_{y(i)}$ represents a center feature corresponding to the $i^{th}$ training sample, and $\mu_{y(i)}$ represents a mean of the feature distribution parameters corresponding to the classification category $y(i)$.

In this embodiment, for any training sample, the corresponding first loss component and second loss component are obtained. Then, the comprehensive loss parameter corresponding to the current group of training samples may be determined based on the first loss components and the second loss components of the training samples.

In one embodiment, the foregoing step of obtaining, based on the first loss component and the second loss component, a comprehensive loss parameter corresponding to the current group of training samples may include the following steps: performing a weighted average operation based on the first loss component corresponding to each training sample to obtain a first loss parameter corresponding to the current group of training samples; performing a weighted average operation based on the second loss component corresponding to each training sample to obtain a second loss parameter corresponding to the current group of training samples; and obtaining, based on the first loss parameter and the second loss parameter, the comprehensive loss parameter corresponding to the current group of training samples.

In this embodiment, after the first loss component and the second loss component corresponding to each training sample in the current group of training samples are obtained, a weighted average operation may be performed based on the first loss component corresponding to each training sample in the current group of training samples to obtain the first loss parameter corresponding to the current group of training samples. A weighted average operation may be performed based on the second loss component corresponding to each training sample in the current group of training samples to obtain the second loss parameter corresponding to the current group of training samples.

Specifically, the first loss parameter corresponding to the current group of training samples may be determined according to the following formula:

$$L_s = -\frac{1}{n}\sum_{i=1}^{n}\log\frac{e^{f_i W_{y(i)}^T}}{\sum_{j=1}^{n_c} e^{f_i W_j^T}}$$

where $L_s$ represents the first loss parameter corresponding to the current group of training samples, n represents a total quantity of training samples in the current group of training samples, and $$\log\frac{e^{f_i W_{y(i)}^T}}{\sum_{j=1}^{n_c} e^{f_i W_j^T}}$$

represents a first loss component corresponding to an $i^{th}$ training sample.

In addition, the second loss parameter corresponding to the current group of training samples may be determined according to the following formula:

$$L_f = \frac{1}{n}\sum_{i=1}^{n}\left[1.0 - (2\pi)^{-\frac{n_d}{2}}|\sum_{y(i)}|^{-\frac{1}{2}}e^{-\frac{1}{2}[C_{y(i)}-\mu_{y(i)}]\sum_{y(i)}^{-1}[C_{y(i)}-\mu_{y(i)}]^T}\right]$$

where $L_f$ represents the second loss parameter corresponding to the current group of training samples, n represents the total quantity of training samples in the current group of training samples, and $$\left[1.0 - (2\pi)^{-\frac{n_d}{2}}|\sum_{y(i)}|^{-\frac{1}{2}}e^{-\frac{1}{2}[C_{y(i)}-\mu_{y(i)}]\sum_{y(i)}^{-1}[C_{y(i)}-\mu_{y(i)}]^T}\right]$$

represents a second loss component corresponding to an $i^{th}$ training sample.

In this embodiment, after the first loss parameter and the second loss parameter corresponding to the current group of training samples are obtained, the comprehensive loss parameter corresponding to the current group of training samples may be determined based on both the first loss parameter and the second loss parameter.

In one embodiment, the foregoing step of obtaining the comprehensive loss parameter corresponding to the current group of training samples based on the first loss parameter and the second loss parameter may include the following steps: performing a multiplication operation on the second loss parameter and a first influence coefficient to determine an influence loss parameter; and obtaining, based on the first loss parameter and the influence loss parameter, the comprehensive loss parameter corresponding to the current group of training samples.

In this embodiment, the comprehensive loss parameter corresponding to the current group of training samples may be specifically determined according to the following formula: $L=L_s+\lambda_1 L_f$, where L represents the comprehensive loss parameter corresponding to the current group of training samples, $L_s$ represents the first loss parameter corresponding to the current group of training samples, $L_f$ represents the second loss parameter corresponding to the current group of training samples, and $\lambda_1$ represents a first influence coefficient. The first influence coefficient is essentially a hyper-parameter, which is used for controlling a proportion of the second loss parameter in the comprehensive loss parameter. A larger first influence coefficient indicates that an output of the to-be-trained model obtained after training is closer to that of the trained model, that is, a higher degree to which the to-be-trained model fits the trained model. In a specific example, a value of $\lambda_1$ may be 0.001.

In one embodiment, the foregoing step of obtaining, based on the first loss component and the second loss component, the comprehensive loss parameter corresponding to the current group of training samples may include the following steps: determining, based on the first loss component and the second loss component corresponding to each training sample, a comprehensive loss component corresponding to each of the training sample; and performing a weighted average operation based on the comprehensive loss components to obtain the comprehensive loss parameter corresponding to the current group of training samples.

In this embodiment, after the first loss component and the second loss component corresponding to each training sample in the current group of training samples are obtained, the comprehensive loss component corresponding to each training sample may be determined based on the first loss component and the second loss component of each of the training sample. It can be seen that each training sample corresponds to one comprehensive loss component. Then, a weighted average operation is performed based on the comprehensive loss component corresponding to each training sample to obtain the comprehensive loss parameter corresponding to the current group of training samples.

Specifically, the comprehensive loss parameter corresponding to the current group of training samples may be determined according to the following formula:

$$L = \frac{1}{n}\sum_{i=1}^{n} L_i,$$

where L represents the comprehensive loss parameter corresponding to the current group of training samples, n represents the total quantity of training samples in the current group of training samples, and $L_i$ represents a comprehensive loss component corresponding to an $i^{th}$ training sample.

In one embodiment, the foregoing step of determining, based on the first loss component and the second loss component corresponding to each training sample, a comprehensive loss component corresponding to each of the training sample may include the following steps: performing a multiplication operation on a second influence coefficient and the second loss component corresponding to each training sample to determine an influence loss component of each of the training sample; and obtaining, based on the first loss component and the influence loss component corresponding to each training sample, the comprehensive loss component corresponding to each training sample.

Specifically, the comprehensive loss component corresponding to each training sample may be determined according to the following formula: $L_i = L_{s-i} + \lambda_2 L_{f-i}$, where $L_i$ represents a comprehensive loss component corresponding to an $i^{th}$ training sample, $L_{s-i}$ represents a first loss component corresponding to the $i^{th}$ training sample, $L_{f-i}$ represents a second loss component corresponding to the $i^{th}$ training sample, and $\lambda_2$ represents a second influence coefficient. Similar to the first influence coefficient, the second influence coefficient is essentially a hyperparameter, which is used for controlling a proportion of the second loss component in the comprehensive loss component. A larger second influence coefficient indicates that an output of the to-be-trained model obtained after training is closer to that of the trained model, that is, a higher degree to which the to-be-trained model fits the trained model. In a specific example, a value of $\lambda_2$ may be 0.001.

In one embodiment, after the foregoing step of adjusting the model parameters of the to-be-trained model based on the comprehensive loss parameter, that is, after step S208, the method may further include the following steps: determining a next group of training samples based on the training set if a training stop condition is not met; and using the next group of training samples as the current group of training samples, and performing the step of retrieving a current group of training samples (that is, step S202).

The training stop condition is a condition for ending the training of the model. The training stop condition may be set based on an actual requirement. For example, the training stop condition may be that a preset quantity of iterations is reached, or may be that a classification performance indicator of the to-be-trained model after an adjustment of the model parameter reaches a preset threshold.

To complete training of the to-be-trained model, usually multiple model parameter adjustments need to be performed. Based on this, after the model parameters of the to-be-trained model are adjusted based on the comprehensive loss parameter, it may be determined whether the training stop condition is met. If the training stop condition is not met, indicating that the training needs to be continued, a next group of training samples may be determined based on the training set, and by using the next group of training samples as the current group of training samples, the model training method provided in any one of the embodiments of this application is performed again (for example, step S202 to step S208 are performed again). If the training stop condition is met, indicating that no further training is required, the training process may be ended.

The next group of training samples may be a group of training samples that is in the training set and is located after the current group of training samples. For example, a training set Sett3 is divided into five groups of training samples (G1 to G5) arranged in sequence. During one adjustment of the model parameters of the to-be-trained model, G1 is used as the current group of training samples. After the model parameters are adjusted once through a series of processing based on G1, a next group G2 of training samples that is located after G1 may be used as the current group of training samples if the training stop condition is not met. Similarly, after the model parameters are adjusted once through a series of processing based on G2, a next group G3 of training samples that is located after G2 may be used as the current group of training samples if the training stop condition is still not met. Similarly, after the model parameters are adjusted once through a series of processing based on G5, the next group G1 of training samples that is located after G5 may be used as the current group of training samples if the training stop condition is still not met. The subsequent determinations of the current group of training samples is are similar to the determination process, and details will not be provided herein again.

In addition, when the training stop condition is met, a to-be-trained model corresponding to the moment at which the training stop condition is met may be stored (this model is hereinafter briefly referred to as a target model), so that subsequently when the target model needs to be used, the target model can be directly obtained and used. Alternatively, when the training stop condition is met, only model parameters of a to-be-trained model corresponding to the moment at which the training stop condition is met are stored (the model parameters are hereinafter briefly referred to as target model parameters). Subsequently when the target model needs to be used, the target model parameters may be obtained and imported into a corresponding model framework to obtain the target model for use.

Figure 3:
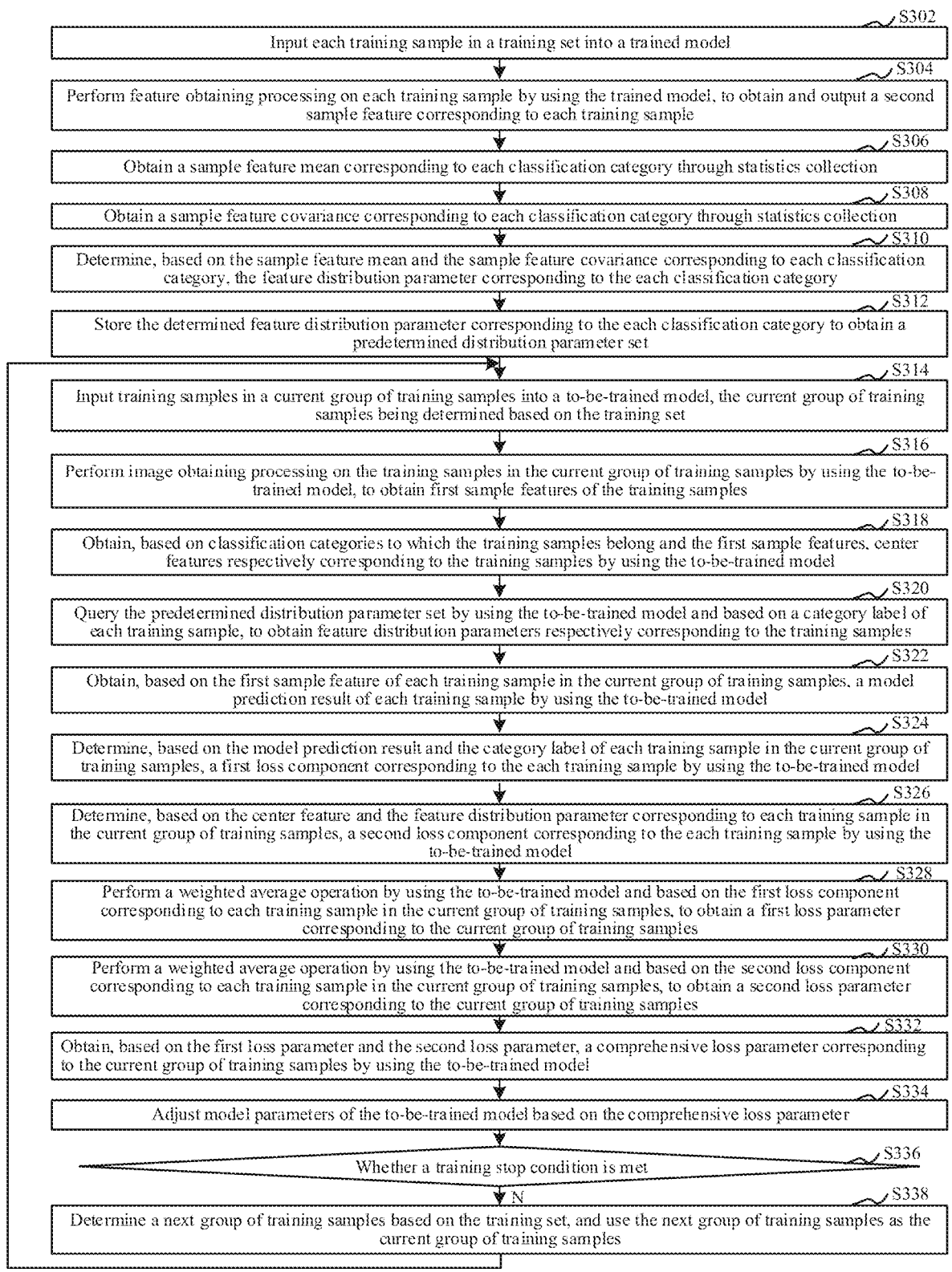
FIG. 3 is a schematic flowchart of a model training method according to one embodiment.

As shown in FIG. 3, one embodiment provides a model training method. Specifically, the method may include step S302 to step S338.

S302: A computer device inputs each training sample in a training set into a trained model, the training set being used for training a to-be-trained model, the trained model being a model that has been trained, and a model scale parameter of the trained model being greater than that of the to-be-trained model.

S304: The computer device performs feature obtaining processing on each training sample by using the trained model, to obtain and output a second sample feature of each training sample.

S306: The computer device obtains a sample feature mean corresponding to each classification category through statistics collection, the sample feature mean corresponding to each classification category being a mean of second sample features of the training samples in the training set that belong to each of the classification category.

S308: The computer device obtains a sample feature covariance corresponding to each classification category through statistics collection, the sample feature covariance corresponding to each classification category being a covariance of the second sample features of the training samples in the training set that belong to each of the classification category.

S310: The computer device determines, based on the sample feature mean and the sample feature covariance corresponding to each classification category, a feature distribution parameter corresponding to each of the classification category.

S312: The computer device stores the determined feature distribution parameter corresponding to each of the classification category to obtain a distribution parameter set.

S314: The computer device inputs training samples in a current group of training samples into the to-be-trained model, the current group of training samples being determined based on the training set.

S316: The computer device performs image obtaining processing on the training samples in the current group of training samples by using the to-be-trained model, to obtain first sample features of the training samples.

S318: The computer device obtains, based on classification categories to which the training samples belong and the first sample features, center features respectively corresponding to the training samples by using the to-be-trained model.

S320: The computer device queries a distribution parameter set by using the to-be-trained model and based on a category label of each training sample, to obtain the feature distribution parameter corresponding to each of the training sample, the category label being used for representing the classification category to which the corresponding training sample belongs.

S322: The computer device obtains, based on the first sample feature of each training sample in the current group of training samples, a model prediction result of each of the training sample by using the to-be-trained model.

S324: The computer device determines, based on the model prediction result and the category label of each training sample in the current group of training samples, a first loss component corresponding to each of the training sample by using the to-be-trained model.

S326: The computer device determines, based on the center feature and the feature distribution parameter corresponding to each training sample in the current group of training samples, a second loss component corresponding to each training sample by using the to-be-trained model.

S328: The computer device performs a weighted average operation by using the to-be-trained model and based on the first loss component corresponding to each training sample in the current group of training samples, to obtain a first loss parameter corresponding to the current group of training samples.

S330: The computer device performs a weighted average operation by using the to-be-trained model and based on the second loss component corresponding to each training sample in the current group of training samples, to obtain a second loss parameter corresponding to the current group of training samples.

S332: The computer device obtains, based on the first loss parameter and the second loss parameter, a comprehensive loss parameter corresponding to the current group of training samples by using the to-be-trained model.

S334: The computer device adjusts model parameters of the to-be-trained model based on the comprehensive loss parameter.

S336: The computer device determines whether a training stop condition is met. If the training stop condition is not met, the computer device determines a next group of training samples based on the training set and performs step S338. If the training stop condition is met, the computer device ends the training process (not shown).

S338: The computer device determines the next group of training samples based on the training set, uses the next group of training samples as the current group of training samples, and performs step S314.

Specific definitions of technical features in this embodiment may be the same as those of the corresponding technical features in the foregoing description, and details will not be provided herein again.

Figure 4:
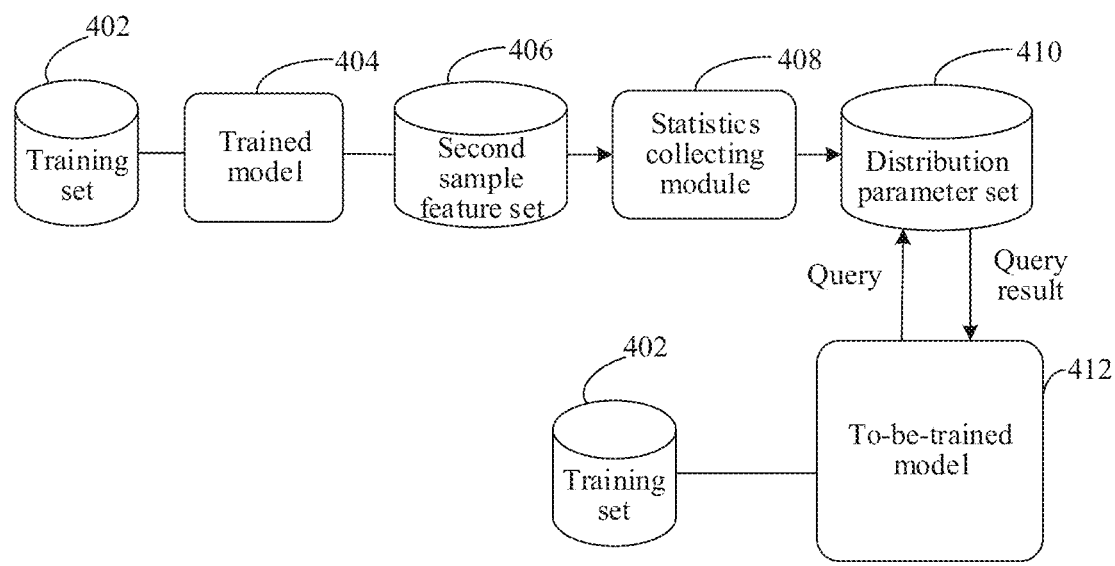
FIG. 4 is a schematic diagram showing components for implementing a model training method according to one embodiment.
Figure 5:
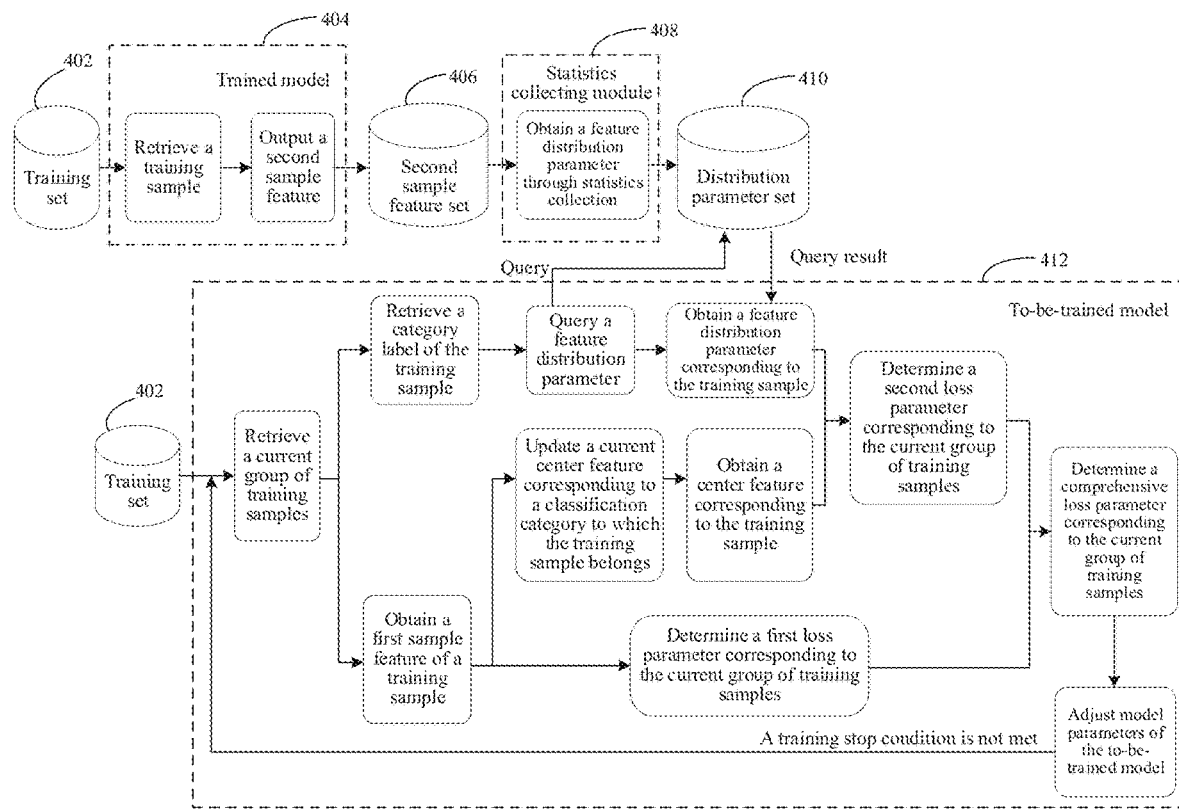
FIG. 5 is a simplified schematic flowchart of a model training method according to one embodiment.

In addition, with reference to FIG. 4 and FIG. 5, a computer device that implements the model training method provided in this application may include the following components: a training set 402, a trained model 404, a second sample feature set 406, a statistics collecting module 408, a distributed parameter set 410, and a to-be-trained model 412.

The training set 402 may be configured to record training samples that are used for training the to-be-trained model 412. The trained model 404 may be configured to retrieve each training sample in the training set 402 and output a second sample feature of each training sample. The second sample feature set 406 may be configured to record the second sample features that are outputted by the trained model 404. The statistics collecting module 408 is a runnable program function module, and may be configured to collect statistics on second sample features of training samples in the training set that belong to each classification category to determine a feature distribution parameter corresponding to each of the classification category. The distribution parameter set 410 may be configured to record the feature distribution parameters obtained through statistics collection. The to-be-trained model 412 may be configured to query the distribution parameter set 410 to obtain a feature distribution parameter corresponding to a corresponding training sample and perform operations in the dashed-line box in which the to-be-trained model 412 is located in FIG. 5 (details will not be provided herein again) to train the to-be-trained model 412.

It is to be understood that although the steps in the flowcharts corresponding to the foregoing embodiments are sequentially displayed as indicated by arrows, these steps are not necessarily performed sequentially in the order indicated by the arrows. Unless expressly stated in this application, the order in which these steps are performed is not strictly limited herein, and, these steps may be performed in other orders. In addition, at least some of the steps in the flowcharts may include a plurality of sub-steps or phases. These sub-steps or phases are not necessarily performed at the same moment, and may be performed at different moments. These sub-steps or phases are not necessarily performed in sequence, and may be performed in turn or alternately with other steps or at least some of sub-steps or phases of other steps.

The model training methods provided in the embodiments of this application may be applied to face recognition. Specifically, a corresponding face image training set is obtained for a specific face recognition task first. Then, a to-be-trained model is trained based on face image samples in the face image training set and the model training method provided in any one of the embodiments of this application. After the training is complete, a face recognition model capable of implementing the face recognition task is obtained. In this way, in practical applications, upon retrieving a to-be-recognized face image, the face recognition model can output a corresponding recognition result.

The face recognition task may be a task in 1:1 mode, 1:N mode, or the like. The 1:1 mode, also called an authentication mode, is essentially quickly comparing a to-be-recognized face image with an image database to obtain a recognition result indicating whether they match or not, and is applied to scenarios such as "face swiping" boarding, "face swiping" ticket check, and "face swiping" payment. The 1:N mode is searching a massive image database for a to-be-recognized face image, and is applied to scenarios such as identifying a pedestrian who runs a red light through "face swiping".

Figure 6:
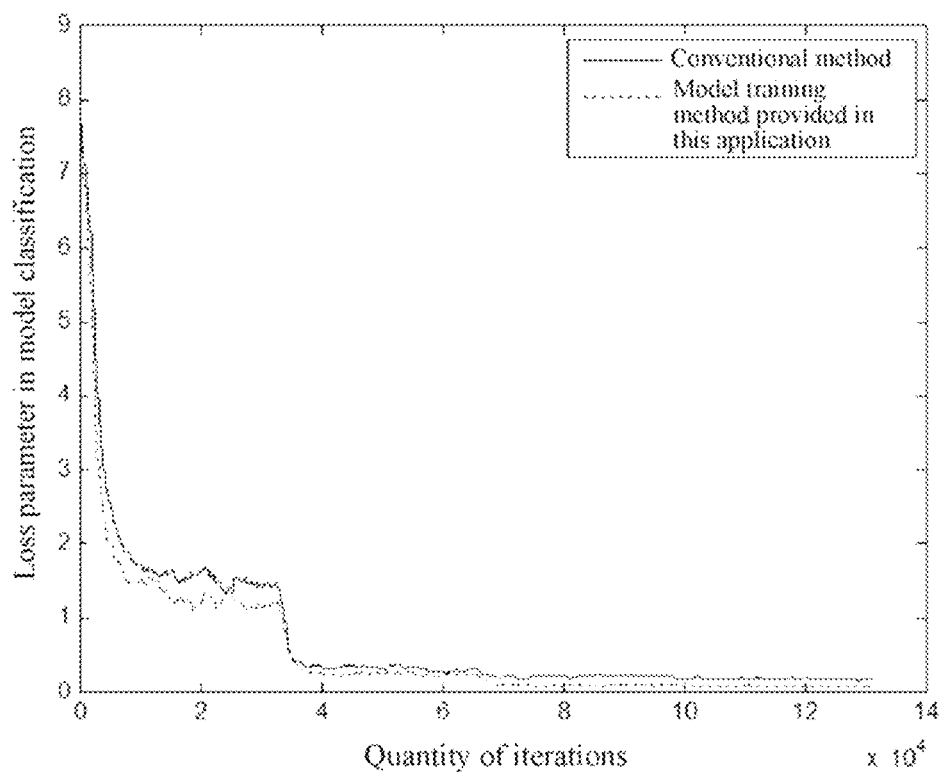
FIG. 6 is a schematic diagram showing curves of loss parameters according to one embodiment.
Figure 7:
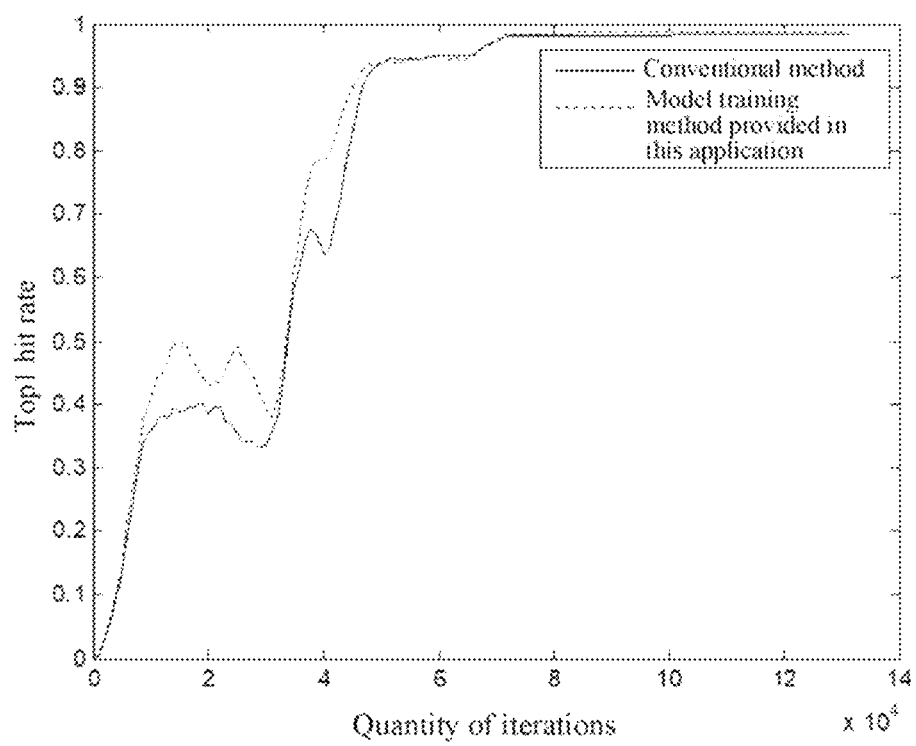
FIG. 7 is a schematic diagram showing curves of hit rates according to one embodiment.

The following describes an experimental result of a specific face recognition task. FIG. 6 shows curves of loss parameters in model classification when a to-be-trained model is trained based on a self-developed training set with 3000 categories respectively by using the model training method according to embodiments of this application and a conventional method. As can be seen from FIG. 6, when the model training method according to embodiments of is used to train the to-be-trained model, the loss parameter converges faster and finally converges to a smaller value. In addition, FIG. 7 is a schematic diagram showing curves of Top1 hit rates of models obtained through training based on a self-developed test set with 3000 categories respectively by using the model training method according to embodiments of and the conventional method. It can be seen from FIG. 7 that, compared with the model obtained through training using the conventional method, the model obtained through training using the model training method according to embodiments of exhibits higher accuracy of the test set.

Table 1 below shows information about an actual service dataset. The actual service dataset includes both data of an experiment in 1:1 mode and data of an experiment in 1:N mode. The experiment in 1:1 mode corresponds to a face authentication service (that is, checking an identity based on a face image), and the experiment in 1:N mode corresponds to a face recognition service.

TABLE 1

| Name of Actual Service Evaluation Set | | Total Quantity of Identities | Dataset Scenario Description |
|---|---|---|---|
| Experiment evaluation set in 1:1 mode | TCSetFV_IdQz1 | 497 | High-definition ID photos and selfies |
| | TCSetFV_Qzl | 698 | ID photos and selfies |
| | TCSetFV_WmCam | 1000 | Mobile phone selfies, despeckled, photos and high-definition ID photos |
| Experiment evaluation set in 1:N mode | TCSetFR_cam | 1000 | Surveillance scene photos acquired by IP Cam |
| | TCSetFR_id | 1000 | High-definition ID photos corresponding to TCSetFR_cam |
| | TCSetFR ZJZ300W | 2982921 | High-definition ID photos |

Table 2 below shows test results of the foregoing experiment in 1:1 mode (face authentication service) performed based on the actual service dataset shown in Table 1 respectively by using the model obtained through training using the model training method provided in this application and the model obtained through training using the conventional method. Table 3 below shows test results of the foregoing experiment in 1:N mode (face recognition service) performed respectively by using the model obtained through training using the model training method provided in this application and the model obtained through training using the conventional method.

TABLE 2

| | Name of Actual Service Evaluation Set | | | | | |
|---|---|---|---|---|---|---|
| | TCSetFV_Qzl | | TCSetFVIdQzl | | TCSetFV_hldCaml | |
| Method Name | FAR = 0.1% | FAR = 0.01% | FAR = 0.1% | FAR = 0.01% | FAR = 0.01% | FAR = 0.01% |
| Conventional method | 94.73% | 93.09% | 98.09% | 95.03% | 98.39% | 97.28% |
| Model training method provided in this application | 94.90% | 93.46% | 98.36% | 96.49% | 98.61% | 98.11% |

TABLE 3

| Method Name | Name of Actual Service Evaluation Set | | | |
| --- | --- | --- | --- | --- |
| | Test set: TCSetFR_cam; registration set:: TCSetFR_id + TCSetFR_ZJZ300W (Registration scale: 3,000,000) | | | |
| | Top 1 | far = one in a million | far = one in 10 millions | far = one in 100 millions |
| Conventional method | 82.47% | 89.53% | 76.73% | 64.07% |
| Model training method provided in this application | 88.07% | 92.87% | 82.33% | 69.87% |

In Table 2 and Table 3, both far and FAR (false acceptance rate) indicate an error acceptance rate, and Top1 indicates a first-hit rate. It can be seen from the comparison results in Table 2 and Table 3 that in both the experiment in 1:1 mode and the experiment in 1:N mode, in the case of the same error acceptance rate, the verification rate of the model obtained through training using the model training method provided in this application is significantly higher than that of the model obtained through training using the conventional method.

Figure 8:
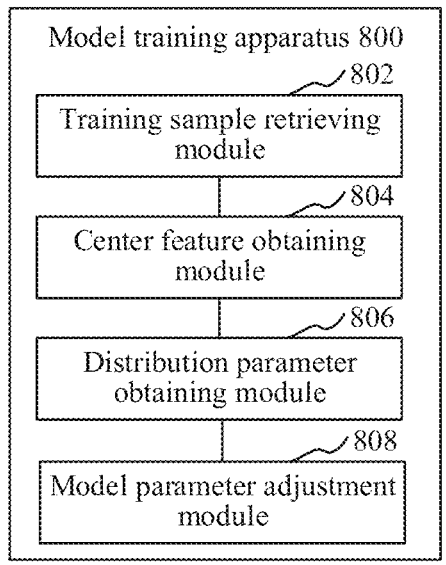
FIG. 8 is a structural block diagram of a model training apparatus according to one embodiment.

As shown in FIG. 8, one embodiment provides a model training apparatus 800. The apparatus may include a training sample retrieving module 802, a center feature obtaining module 804, a distribution parameter obtaining module 806, and a model parameter adjustment module 808.

The training sample retrieving module 802 is configured to read a current group of training samples, the current group of training samples being determined based on a training set.

The center feature obtaining module 804 is configured to obtain first sample features of training samples in the current group of training samples by using a to-be-trained model, and obtain, based on classification categories to which the training samples belong and the first sample features, center features respectively corresponding to the training samples.

The distribution parameter obtaining module 806 is configured to obtain feature distribution parameters respectively corresponding to the training samples, the feature distribution parameter corresponding to each training sample being obtained by collecting statistics on second sample features of training samples in the training set that belong to the same classification category as each of the training sample, and the second sample feature of each training sample being outputted by a trained model based on each of the training sample.

The model parameter adjustment module 808 is configured to obtain, based on the center features and the feature distribution parameters, a comprehensive loss parameter corresponding to the current group of training samples, and adjust model parameters of the to-be-trained model based on the comprehensive loss parameter.

In one embodiment, the distribution parameter obtaining module 806 may be specifically configured to: query a distribution parameter set based on a category label of each training sample to obtain the feature distribution parameter corresponding to each of the training sample, the category label being used for representing the classification category to which the corresponding training sample belongs, and the distribution parameter set including the feature distribution parameter corresponding to each classification category.

In one embodiment, the model training apparatus 800 may further include the following modules: a training sample input module, configured to input each training sample in the training set into the trained model; a second feature output module, configured to output the second sample feature of each training sample in the training set by using the trained model; a distribution feature determining module, configured to collect statistics on second sample features of training samples in the training set that belong to each classification category to determine a feature distribution parameter corresponding to each of the classification category; and a distribution parameter set obtaining module, configured to store the determined feature distribution parameter corresponding to each of the classification category, to obtain the distribution parameter set.

In one embodiment, the distribution parameter determining module may include the following units: a feature mean determining unit, configured to determine a sample feature mean corresponding to each classification category, the sample feature mean corresponding to each classification category being a mean of second sample features of the training samples in the training set that belong to the classification category; a feature covariance determining unit, configured to determine a sample feature covariance corresponding to each classification category, the sample feature covariance corresponding to each classification category being a covariance of the second sample features of the training samples in the training set that belong to each of the classification category; and a distribution parameter determining unit, configured to determine, based on the sample feature mean and the sample feature covariance corresponding to each classification category, the feature distribution parameter corresponding to each of the classification category.

In one embodiment, the model training apparatus 800 may further include the following modules: a prediction result obtaining module, configured to obtain, based on the first sample features, a model prediction result of each training sample by using the to-be-trained model; and a first loss component determining module, configured to determine, based on the model prediction result and the category label of each training sample, a first loss component corresponding to each of the training sample, the category label being used for representing the classification category to which the corresponding training sample belongs. In this case, the model parameter adjustment module 808 may include the following units: a second loss component determining unit, configured to determine, based on the center features and the feature distribution parameters, a second loss component corresponding to each training sample; and a comprehensive loss parameter determining unit, configured to obtain, based on the first loss component and the second loss component, the comprehensive loss parameter corresponding to the current group of training samples.

In one embodiment, the comprehensive loss parameter determining unit may include the following subunits: a first loss parameter determining subunit, configured to perform a weighted average operation based on the first loss component corresponding to each training sample to obtain a first loss parameter corresponding to the current group of training samples; a second loss parameter determining subunit, configured to perform a weighted average operation based on the second loss component corresponding to each training sample to obtain a second loss parameter corresponding to the current group of training samples; and a first comprehensive parameter determining subunit, configured to obtain, based on the first loss parameter and the second loss parameter, the comprehensive loss parameter corresponding to the current group of training samples.

In one embodiment, the first comprehensive parameter determining subunit may be specifically configured to: a multiplication operation on the second loss parameter and a first influence coefficient to determine an influence loss parameter; and obtain, based on the first loss parameter and the influence loss parameter, the comprehensive loss parameter corresponding to the current group of training samples.

In one embodiment, the comprehensive loss parameter determining unit may include the following subunits: a comprehensive loss component determining subunit, configured to determine, based on the first loss component and the second loss component corresponding to each training sample, a comprehensive loss component corresponding to each of the training sample; and a second comprehensive parameter determining subunit, configured to perform a weighted average operation based on the comprehensive loss components to obtain the comprehensive loss parameter corresponding to the current group of training samples.

In one embodiment, the second comprehensive parameter determining subunit may be specifically configured to: perform a multiplication operation on a second influence coefficient and the second loss component corresponding to each training sample to determine an influence loss component of each of the training sample; and obtain, based on the first loss component and the influence loss component corresponding to each training sample, the comprehensive loss component corresponding to each of the training sample.

In one embodiment, the center feature obtaining module 804 may be specifically configured to: sequentially determine, for each training sample, a current center feature corresponding to the classification category to which each of the training sample belongs, and update the current center feature based on the first sample feature of each of the training sample to obtain an updated center feature corresponding to the classification category to which each of the training sample belongs, the center feature corresponding to each of the training sample including the updated center feature.

In one embodiment, the model training apparatus 800 may further include the following modules: a next training sample group determining module, configured to determine a next group of training samples based on the training set if a training stop condition is not met; and a returning module, configured to: use the next group of training samples as the current group of training samples, and invoke the training sample retrieving module 802 to perform the step of retrieving a current group of training samples.

In one embodiment, the training samples include face image samples, a scale parameter of the trained model is greater than a scale parameter of the to-be-trained model, and the scale parameter includes a depth of a model.

Specific definitions of technical features in the model training apparatus 800 are discussed in the corresponding technical features in the foregoing image recognition method, and details will not be described herein again. In addition, all or some of the modules in the model training apparatus 800 or in other embodiments may be implemented by using software, hardware, or combinations thereof. The foregoing modules may be embedded in or independent of a processor of a computer device in a hardware form, or may be stored in a memory of the computer device in a software form, so that the processor invokes and performs the operations corresponding to the foregoing modules.

In one embodiment, a computer device is provided, including a memory and a processor. The memory stores a computer program. The processor, when executing the computer program, performs the steps of the model training method provided in any one of the embodiments of this application.

In one example, the computer device may be the server 120 shown in FIG. 1. The internal structure of the computer device may be shown in FIG. 9. The computer device includes a processor, a memory, a network interface, and a database that are connected through a system bus. The processor is configured to provide computing and control capabilities. The memory includes a non-volatile storage medium and an internal memory. The non-volatile storage medium stores an operating system, a computer program, and a database. The internal memory provides an environment for running of the operating system and the computer program in the non-volatile storage medium. The database is configured to store feature distribution parameters. The network interface is configured to communicate with an external terminal through a network connection. The computer program is executed by the processor to implement a model training method.

In another example, the computer device may be the terminal 110 shown in FIG. 1. The internal structure of the computer device may be shown in FIG. 10. The computer device includes a processor, a memory, a network interface, a display, and an input apparatus that are connected through a system bus. The processor is configured to provide computing and control capabilities. The memory includes a non-volatile storage medium and an internal memory. The non-volatile storage medium stores an operating system and a computer program. The internal memory provides an environment for running of the operating system and the computer program in the non-volatile storage medium. The computer program is executed by the processor to implement a model training method. The network interface is configured to communicate with an external terminal through a network connection. The display may be a liquid crystal display or an electronic ink display. The input apparatus of the computer device may be a touch layer covering the display, or may be a key, a trackball, or a touchpad disposed on an enclosure of the computer device, or may be an external keyboard, touchpad, or mouse.

Figure 9:
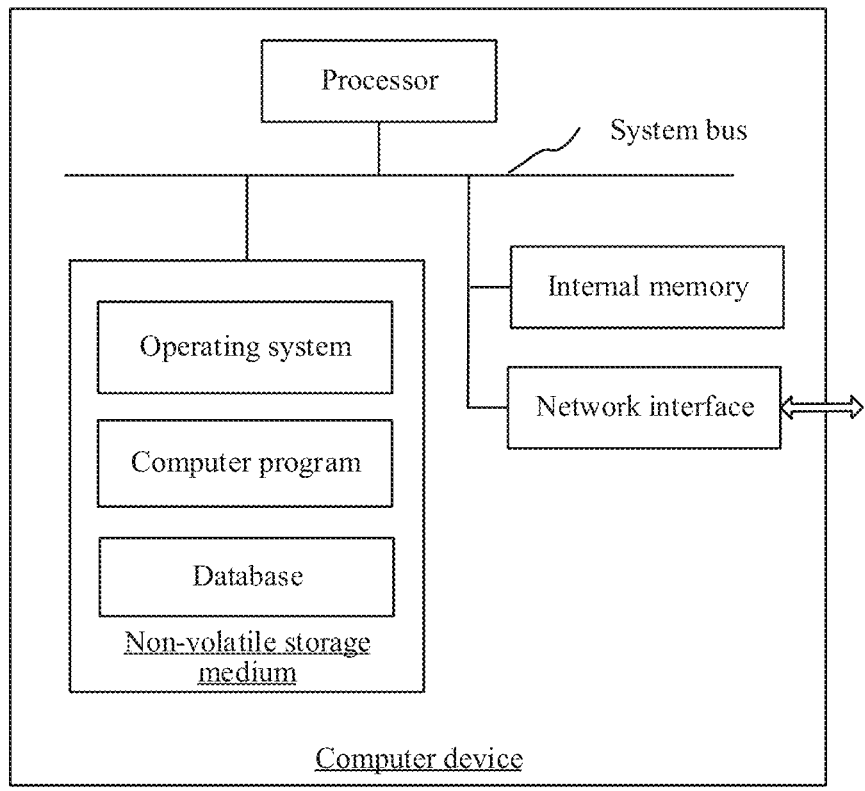
FIG. 9 is a structural block diagram of a computer device according to one embodiment.
Figure 10:
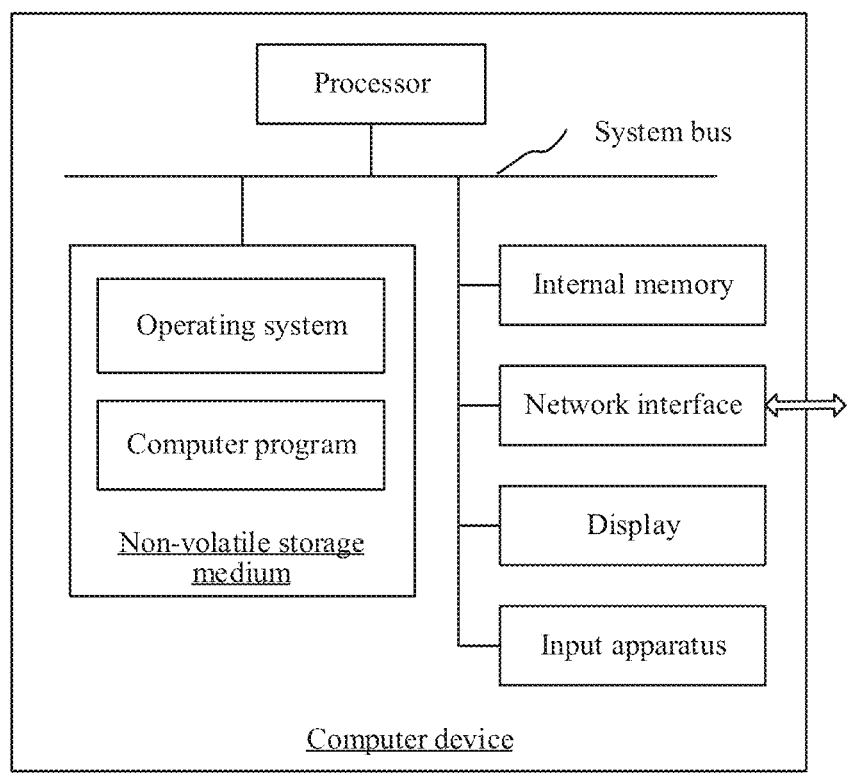
FIG. 10 is a structural block diagram of a computer device according to one embodiment.

A person skilled in the art may understand that the structure shown in FIG. 9 and FIG. 10 are merely block diagrams of part of the structure related to the solution of this application, and do not constitute a limitation to the computer device to which the solution of this application is applied. Specifically, the computer device may include more or fewer components than those shown in the figure, or some components may be combined, or a different component configuration may be used.

In one embodiment, the model training apparatus provided in this application may be implemented in a form of a computer program, and the computer program may be run on the computer device shown in FIG. 9 or FIG. 10. The memory of the computer device may store program modules forming the model training apparatus, for example, the training sample retrieving module 802, the center feature obtaining module 804, the distribution parameter obtaining module 806, and the model parameter adjustment module 808 in FIG. 8. The computer program formed by the program modules causes the processor to perform the steps of the model training method provided in the embodiments of this application. For example, the computer device shown in FIG. 8 or FIG. 9 may perform step S202 by using the training sample retrieving module 802 in the model training apparatus 800 shown in FIG. 8, perform step S204 by using the center feature obtaining module 804, perform step S206 by using the distribution parameter obtaining module 806, and perform step S208 by using the model parameter adjustment module 808.

A person of ordinary skill in the art may understand that all or some of the processes in the foregoing method embodiments may be implemented by a computer program instructing related hardware. The program may be stored in a non-volatile computer-readable storage medium, and the program, when executed, may include the processes in the foregoing method embodiments. Any reference to the memory, storage, database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. By way of example and not limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

Based on this, in one embodiment, a computer-readable storage medium is provided. The computer-readable storage medium stores a computer program. The computer program, when executed by a processor, performs the model training method provided in any one of the embodiments of this application.

The technical features in the foregoing embodiments may be combined arbitrarily. For the brevity of description, not all possible combinations of the technical features in the embodiments are described. However, the combinations of the technical features are all to be considered as falling within the scope set forth in this specification provided that they do not conflict with each other.

The foregoing embodiments only describe several implementations of this application, which are described specifically and in detail, but cannot be construed as a limitation to the patent scope of this application. A person of ordinary skill in the art may further make variations and improvements without departing from the ideas of this application, and such variations and improvements all fall within the protection scope of this application. Therefore, the protection scope of this application is subject to the protection scope of the appended claims.

What is claimed is:

1. A model training method, implemented by a computer device, comprising:
    retrieving a current group of training samples, the current group of training samples being determined based on a training set;
    obtaining first sample features of training samples in the current group of training samples based on a to-be-trained model, and obtaining, based on classification categories to which the training samples belong and the first sample features, center features corresponding to the training samples, wherein the center features corresponding to the training samples include updated center features, and the updated center features are obtained by:
    sequentially determining, for each training sample, a current center feature corresponding to the classification category to which the training sample belongs, and updating the current center feature based on the first sample feature of the training sample, to obtain an updated center feature corresponding to the training sample;
        obtaining feature distribution parameters corresponding to the training samples, the feature distribution parameter corresponding to each training sample being obtained based on second sample features of training samples in the training set that belong to the same classification category as each of the training sample, and the second sample feature of each training sample being generated by a trained model based on each of the training sample;
        obtaining, based on the center features and the feature distribution parameters, a comprehensive loss parameter corresponding to the current group of training samples; and
    adjusting model parameters of the to-be-trained model based on the comprehensive loss parameter.

2. The method according to claim 1, wherein the obtaining, by the computer device, feature distribution parameters corresponding to the training samples comprises:
    querying, by the computer device, a distribution parameter set based on a category label of each training sample, to obtain the feature distribution parameter corresponding to each of the training sample, the category label representing the classification category to which the corresponding training sample belongs, and the distribution parameter set comprising a feature distribution parameter corresponding to each classification category.

3. The method according to claim 2, wherein a manner of obtaining the distribution parameter set comprises:
    inputting each training sample in the training set into the trained model;
    outputting a second sample feature of each training sample in the training set based on the trained model;
    collecting statistics on second sample features of training samples in the training set that belong to each classification category to determine the feature distribution parameter corresponding to each of the classification category; and
    storing the determined feature distribution parameter to obtain the distribution parameter set.

4. The method according to claim 3, wherein the collecting, by the computer device, statistics on second sample features of training samples in the training set that belong to each classification category, to determine the feature distribution parameter corresponding to each of the classification category comprises:
    determining, by the computer device, a sample feature mean corresponding to each classification category, the sample feature mean being a mean of second sample features of the training samples in the training set that belong to each of the classification category;

determining, by the computer device, a sample feature covariance corresponding to each classification category, the sample feature covariance being a covariance of the second sample features of the training samples in the training set that belong to each of the classification category; and determining, by the computer device based on the sample feature mean and the sample feature covariance corresponding to each classification category, the feature distribution parameter corresponding to each of the classification category.

5. The method according to claim 1, wherein before the obtaining, by the computer device based on the center features and the feature distribution parameters, a comprehensive loss parameter corresponding to the current group of training samples, the method further comprises:

obtaining, by the computer device based on the first sample features, a model prediction result of each training sample based on the to-be-trained model; and determining, by the computer device based on the model prediction result and a category label of each training sample, a first loss component corresponding to each of the training sample, the category label representing the classification category to which the corresponding training sample belongs; and the obtaining, by the computer device based on the center features and the feature distribution parameters, a comprehensive loss parameter corresponding to the current group of training samples comprises:

determining, by the computer device based on the center features and the feature distribution parameters, a second loss component corresponding to each of the training sample; and obtaining, by the computer device based on the first loss components and the second loss components, the comprehensive loss parameter corresponding to the current group of training samples.

6. The method according to claim 5, wherein the obtaining, by the computer device based on the first loss components and the second loss components, the comprehensive loss parameter corresponding to the current group of training samples comprises:

performing, by the computer device, a weighted average operation based on the first loss component corresponding to each training sample, to obtain a first loss parameter corresponding to the current group of training samples;

performing, by the computer device, a weighted average operation based on the second loss component corresponding to each training sample, to obtain a second loss parameter corresponding to the current group of training samples; and obtaining, by the computer device based on the first loss parameter and the second loss parameter, the comprehensive loss parameter corresponding to the current group of training samples.

7. The method according to claim 6, wherein the obtaining, by the computer device based on the first loss parameter and the second loss parameter, the comprehensive loss parameter corresponding to the current group of training samples comprises:

performing, by the computer device, a multiplication operation on the second loss parameter and a first influence coefficient to determine an influence loss parameter; and obtaining, by the computer device based on the first loss parameter and the influence loss parameter, the comprehensive loss parameter corresponding to the current group of training samples.

8. The method according to claim 5, wherein the obtaining, by the computer device based on the first loss components and the second loss components, the comprehensive loss parameter corresponding to the current group of training samples comprises:

determining, by the computer device based on the first loss component and the second loss component corresponding to each training sample, a comprehensive loss component corresponding to each of the training sample; and performing, by the computer device, a weighted average operation based on the comprehensive loss components, to obtain the comprehensive loss parameter corresponding to the current group of training samples.

9. The method according to claim 8, wherein the determining, by the computer device based on the first loss component and the second loss component corresponding to each training sample, a comprehensive loss component corresponding to each of the training sample comprises:

performing, by the computer device, a multiplication operation on a second influence coefficient and the second loss component corresponding to each training sample to determine an influence loss component of each of the training sample; and determining, by the computer device based on the first loss component and the influence loss component corresponding to each training sample, the comprehensive loss component corresponding to each of the training sample.

10. The method according to claim 1, wherein after the adjusting, by the computer device, model parameters of the to-be-trained model based on the comprehensive loss parameter, the method further comprises:

determining, by the computer device, a next group of training samples based on the training set in a case that a training stop condition is not met; and using, by the computer device, the next group of training samples as the current group of training samples, and performing the operation of retrieving a current group of training samples.

11. The method according to claim 1, wherein:
the training samples comprise face image samples; and
a scale parameter of the trained model is greater than a scale parameter of the to-be-trained model, the scale parameter comprising a depth of a model.

12. A computer device, comprising a memory and a processor, the memory storing a computer program, and the processor, when executing the computer program, performing a model training method comprising:

receiving a current group of training samples, the current group of training samples being determined based on a training set;

obtaining first sample features of training samples in the current group of training samples based on a to-be-trained model, and obtaining, based on classification categories to which the training samples belong and the first sample features, center features corresponding to the training samples, wherein the center features corresponding to the training samples include updated center features, and the updated center features are obtained by: sequentially determining, for each training sample, a current center feature corresponding to the classification category to which the training sample belongs, and updating the current center feature based on the first sample feature of the training sample, to obtain an updated center feature corresponding to the training sample;

obtaining feature distribution parameters corresponding to the training samples, the feature distribution parameter corresponding to each training sample being obtained based on second sample features of training samples in the training set that belong to the same classification category as each of the training sample, and the second sample feature of each training sample being generated by a trained model based on each of the training sample;

obtaining, based on the center features and the feature distribution parameters, a comprehensive loss parameter corresponding to the current group of training samples; and adjusting model parameters of the to-be-trained model based on the comprehensive loss parameter.

13. The computer device according to claim 12, wherein the processor, when executing the computer program, performs the following operations:

querying, by the computer device, a distribution parameter set based on a category label of each training sample, to obtain the feature distribution parameter corresponding to each of the training sample, the category label representing the classification category to which the corresponding training sample belongs, and the distribution parameter set comprising a feature distribution parameter corresponding to each classification category.

14. The computer device according to claim 13, wherein the processor, when executing the computer program, performs the following operations:

inputting each training sample in the training set into the trained model;

outputting a second sample feature of each training sample in the training set based on the trained model;

collecting statistics on second sample features of training samples in the training set that belong to each classification category, to determine the feature distribution parameter corresponding to each of the classification category; and storing the determined feature distribution parameter to obtain the distribution parameter set.

15. The computer device according to claim 14, wherein the collecting statistics on second sample features of training samples in the training set that belong to each classification category, to determine the feature distribution parameter corresponding to each of the classification category comprises:

determining a sample feature mean corresponding to each classification category, the sample feature mean being a mean of second sample features of the training samples in the training set that belong to each of the classification category;

determining a sample feature covariance corresponding to each classification category, the sample feature covariance being a covariance of the second sample features of the training samples in the training set that belong to each of the classification category; and determining, based on the sample feature mean and the sample feature covariance corresponding to each classification category, the feature distribution parameter corresponding to each of the classification category.

16. The computer device according to claim 12, wherein the processor, when executing the computer program, performs the following operations:

obtaining, based on the first sample features, a model prediction result of each training sample based on the to-be-trained model; and determining, based on the model prediction result and a category label of each training sample, a first loss component corresponding to each of the training sample, the category label representing the classification category to which the corresponding training sample belongs; and the obtaining, based on the center features and the feature distribution parameters, a comprehensive loss parameter corresponding to the current group of training samples comprises:

determining, based on the center features and the feature distribution parameters, a second loss component corresponding to each training sample; and obtaining, based on the first loss components and the second loss components, the comprehensive loss parameter corresponding to the current group of training samples.

17. The computer device according to claim 16, wherein the processor, when executing the computer program, performs the following operations:

determining, based on the first loss component and the second loss component corresponding to each training sample, a comprehensive loss component corresponding to each of the training sample; and performing a weighted average operation based on the comprehensive loss components, to obtain the comprehensive loss parameter corresponding to the current group of training samples.

18. The computer device according to claim 17, wherein the processor, when executing the computer program, performs the following operations:

performing a multiplication operation on a second influence coefficient and the second loss component corresponding to each training sample to determine an influence loss component of each of the training sample; and determining, based on the first loss component and the influence loss component corresponding to each training sample, a comprehensive loss component corresponding to each of the training sample.

19. The computer device according to claim 16, wherein the obtaining, based on the first loss components and the second loss components, the comprehensive loss parameter corresponding to the current group of training samples comprises:

performing a weighted average operation based on the first loss component corresponding to each training sample, to obtain a first loss parameter corresponding to the current group of training samples;

performing a weighted average operation based on the second loss component corresponding to each training sample, to obtain a second loss parameter corresponding to the current group of training samples; and obtaining, based on the first loss parameter and the second loss parameter, the comprehensive loss parameter corresponding to the current group of training samples.

20. A non-transitory computer-readable storage medium, storing a computer program, the computer program, when executed by a processor, performing a model training method comprising:

receiving a current group of training samples, the current group of training samples being determined based on a training set;

obtaining first sample features of training samples in the current group of training samples based on a to-be-trained model, and obtaining, based on classification categories to which the training samples belong and the first sample features, center features corresponding to the training samples, wherein the center features corresponding to the training samples include updated center features, and the updated center features are obtained by: sequentially determining, for each training sample, a current center feature corresponding to the classification category to which the training sample belongs, and updating the current center feature based on the first sample feature of the training sample, to obtain an updated center feature corresponding to the training sample;

obtaining feature distribution parameters corresponding to the training samples, the feature distribution parameter corresponding to each training sample being obtained by collecting statistics on second sample features of training samples in the training set that belong to the same classification category as each of the training sample, and the second sample feature of each training sample being generated by a trained model based on each of the training sample;

obtaining, based on the center features and the feature distribution parameters, a comprehensive loss parameter corresponding to the current group of training samples; and adjusting model parameters of the to-be-trained model based on the comprehensive loss parameter.

* * * * *